United States Patent
Moarefi et al.

(10) Patent No.: US 12,005,979 B2
(45) Date of Patent: Jun. 11, 2024

(54) VEHICLE PLATFORM, MOTOR VEHICLE, AND METHOD FOR LOADING AND UNLOADING AN UPPER BODY STRUCTURE ONTO AND FROM A VEHICLE PLATFORM OF A MOTOR VEHICLE

(71) Applicants: Hyundai Motor Company, Seoul (KR); Kia Corporation, Seoul (KR)

(72) Inventors: Bahman Moarefi, Mainz (DE); Andrew Vaughan, Mainz (DE); Vincent Laurent, Frankfurt Am Main (DE); Miroslav Kropac, Mainz-Finthen (DE); Jelle Tjebbes, Frankfurt Am Main (DE); Sebastian Kluh, Gimbsheim (DE); Ameya Karmarkar, Russelsheim (DE); Rolf Verhoeven, Frankfurt Am Main (DE); Kadir Oguzcan Ger, Mainz (DE)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 473 days.

(21) Appl. No.: 17/329,316

(22) Filed: May 25, 2021

(65) Prior Publication Data
US 2022/0297778 A1 Sep. 22, 2022

(30) Foreign Application Priority Data
Mar. 22, 2021 (DE) .......................... 102021202745.8

(51) Int. Cl.
*B62D 63/02* (2006.01)
*B62D 63/04* (2006.01)

(52) U.S. Cl.
CPC ........... *B62D 63/025* (2013.01); *B62D 63/04* (2013.01)

(58) Field of Classification Search
CPC ...... B62D 63/025; B62D 63/04; B62D 65/04; B62D 65/14; B62D 27/06; B62D 31/025;
(Continued)

(56) References Cited

U.S. PATENT DOCUMENTS

| | | | | |
|---|---|---|---|---|
| 9,555,731 B2 | * | 1/2017 | Konchan | B60P 1/4414 |
| 10,545,509 B1 | * | 1/2020 | Jessen | B62D 63/025 |

(Continued)

FOREIGN PATENT DOCUMENTS

| | | | | |
|---|---|---|---|---|
| DE | 102019002569 A1 | * | 10/2019 | |
| GB | 2207096 A | * | 1/1989 | B60P 3/42 |

(Continued)

*Primary Examiner* — Amy R Weisberg
*Assistant Examiner* — Wenwei Zhuo
(74) *Attorney, Agent, or Firm* — Fox Rothschild LLP (57) ABSTRACT

A vehicle platform for a vehicle is provided. The platform includes a platform base extending in a longitudinal direction, and a loading system for laterally loading and unloading an upper body structure onto the platform base. The loading system includes first and second fork arms supporting the upper body structure with respect to a vertical direction, and a lifting mechanism coupled to the platform base and the first and second fork arms. The lifting mechanism moves the first and second fork arms relative to the platform base along the vertical direction. The first and second fork arms are spaced apart in the longitudinal direction and each are movable along a lateral direction between a retracted position, in which the fork arms completely overlap with the platform base, and an extended position, in which the fork arms protrude in the lateral direction from a lateral side of the platform base.

12 Claims, 7 Drawing Sheets

(58) Field of Classification Search
CPC .......... B60P 1/6436; B60P 1/649; B66F 7/28;
B66F 7/065; B66F 7/0658; B66F 7/0666;
B66F 7/0675; B66F 7/0683
USPC ... 296/193.04, 193.03, FOR. 118, FOR. 117;
414/498, 486, 352, 522
See application file for complete search history.

(56) References Cited

U.S. PATENT DOCUMENTS

| | | | | |
|---|---|---|---|---|
| 2002/0136625 | A1* | 9/2002 | Namgung | B66F 7/0625 414/563 |
| 2007/0154295 | A1* | 7/2007 | Kuriakose | B60P 1/4421 414/498 |
| 2010/0102596 | A1* | 4/2010 | Chapman | B62D 63/025 296/205 |
| 2018/0345971 | A1* | 12/2018 | Birnschein | B60K 17/356 |
| 2019/0375352 | A1* | 12/2019 | Furuya | H02J 7/00 |
| 2020/0079629 | A1* | 3/2020 | Fiorese | B66F 7/065 |
| 2020/0180706 | A1* | 6/2020 | Cha | B62D 25/08 |
| 2020/0223485 | A1* | 7/2020 | Wang | B62D 21/02 |
| 2021/0122431 | A1* | 4/2021 | Kazimiers | B62D 33/0617 |
| 2021/0331749 | A1* | 10/2021 | Hwang | B62D 65/04 |
| 2022/0134987 | A1* | 5/2022 | Tse | B60R 21/0134 180/271 |
| 2022/0234437 | A1* | 7/2022 | Lee | B62D 21/12 |
| 2022/0274658 | A1* | 9/2022 | Kägi | B60P 3/423 |
| 2022/0281544 | A1* | 9/2022 | Reinauer | B62D 65/04 |
| 2022/0306220 | A1* | 9/2022 | Moarefi | B60P 1/5428 |
| 2023/0009002 | A1* | 1/2023 | Moarefi | B60P 1/649 |

FOREIGN PATENT DOCUMENTS

| | | | | |
|---|---|---|---|---|
| KR | 102549880 | B1 * | 7/2023 | |
| WO | WO-0228762 | A2 * | 4/2002 | ........... B60P 1/6436 |
| WO | WO-2005095192 | A1 * | 10/2005 | ........... B62D 27/06 |
| WO | WO-2019133790 | A1 * | 7/2019 | |

* cited by examiner

VEHICLE PLATFORM, MOTOR VEHICLE, AND METHOD FOR LOADING AND UNLOADING AN UPPER BODY STRUCTURE ONTO AND FROM A VEHICLE PLATFORM OF A MOTOR VEHICLE

CROSS-REFERENCE TO RELATED APPLICATION(S)

This application claims the benefit of priority to German Patent Application No. 102021202745.8, filed on Mar. 22, 2021, the disclosure of which is hereby incorporated in its entirety by reference.

TECHNICAL FIELD

The present invention relates to a vehicle platform for a motor vehicle, to a motor vehicle, and to method for loading and unloading an upper body structure onto and from a vehicle platform of a motor vehicle.

BACKGROUND

A recent trend in the automotive sector is to provide standardized and scalable electric vehicle (EV) platforms to underpin future vehicles in line with a completely new vehicle architecture to save development time and costs and thus get new electric vehicles on the road faster. Accordingly, modular electric-rolling and ready-to-drive platforms, which are also called "skateboards", are specifically designed to be mated with bodies of varies types and shapes. In this approach, the vehicle platform represents the part common to all vehicles and may combine chassis, powertrain, energy storage, crash management and so on. The upper body structure or "top hat" on the other hand comes in several variants specifically designed for different purposes according to the specific need of the customer.

Such purpose-built vehicles (PBV) may be designed for specific applications, like last-mile delivery or autonomous shuttles. They are designed from the start with specific applications in mind, and due to the standardization efforts up front, they can be produced at scale at a much lower price point than could otherwise be achieved. Purpose-built EV platforms may not only be lower in material cost but may also allow better performance in range, acceleration and interior space. Moreover, designing the vehicle architecture entirely around an EV concept, without combustion-engine legacy elements, means fewer compromises and more flexibility on average.

With the modular separation of the vehicle structure, a need arises to swap different body structures quickly and smoothly on top of a vehicle platform.

SUMMARY

Hence, there is a need to find simple yet effective solutions for loading a vehicle platform with an upper body structure.

A first aspect of the inventions provides a vehicle platform for a motor vehicle. The vehicle platform may include a platform base extending in a longitudinal direction and a loading system for laterally loading and unloading an upper body structure onto and from the platform base. The loading system includes a first fork arm and a second fork arm for supporting the upper body structure with respect to a vertical direction, and a lifting mechanism coupled to the platform base and the first and second fork arms, the lifting mechanism being configured to move the first and second fork arms relative to the platform base along the vertical direction. The first and second fork arms are positioned distanced to each other in the longitudinal direction and each are movable along a lateral direction between a retracted position, in which the fork arms completely overlap with the platform base, and an extended position, in which the fork arms protrude in the lateral direction from a lateral side of the platform base.

A second aspect of the invention provides a motor vehicle, in particular an electrically driven vehicle, having a vehicle platform according to the first aspect of the invention.

A third aspect of the invention provides a method for loading and unloading an upper body structure onto and from a vehicle platform of a motor vehicle. The method may in particular employ the vehicle platform of the first aspect or the vehicle of the second aspect of the invention. The method may include engaging first and second fork arms coupled to a platform base of the vehicle platform with the upper body structure, the platform base extending in a longitudinal direction, lifting the upper body structure by moving the first and second fork arms in a vertical direction relative to the platform base by a lifting mechanism coupled to the platform base and the first and second fork arms, moving the fork arms in a lateral direction over a lateral side of the platform base, and lowering the upper body structure by moving the first and second fork arms in the vertical direction relative to the platform base by the lifting mechanism.

One of the ideas on which the present invention is based is that a vehicle platform is enabled to load and unload an upper body structure or "hat" autonomously by aid of a fork like mechanism. Therefore, the vehicle platform may include a loading mechanism having fork arms that are extendable in a lateral direction from a lateral side of a platform base and that are movable up and down in a vertical direction by a lifting mechanism. The platform base may, for example, have a substantially rectangular circumference and extend in a longitudinal direction between a first end and a second end. The lateral sides extend in the longitudinal direction between the first and second ends. A first fork arm may be arranged in the region of the first end, and a second fork arm may be arranged in the region of the second end. The lateral direction extends transverse to the longitudinal direction. The vertical direction extends transverse to the longitudinal direction and transverse to the lateral direction. For example, the vertical direction may be parallel to the direction of gravity. Each fork arm may include a fork arm driving mechanism configured to move the respective fork arm along the lateral direction, e.g. a spindle drive, a hydraulic cylinder, or similar.

Since the fork arms are spaced apart from each other and are movable both, the lateral and the vertical direction, a rapid and stable loading and unloading procedure may be realized. In particular, as the lifting mechanism is integrated with the vehicle platform, i.e. coupled to the vehicle base, the vehicle platform itself is provided with the component to load and unload the upper body structure rapidly and smoothly without the need for additional tools, components and/or devices. In this way, PVB top hats, for example, may be exchanged rapidly and independently. Thus, the present invention solves one of the main challenges of PVB mobility concepts in an elegant way by enabling loading and unloading within one integrated concept.

According to some exemplary embodiments, the first and second fork arms may each include at least one engagement structure configured to engage with a corresponding fork arm engagement structure of the upper body structure. The at least one engagement structure of the first and second fork arms may be formed by a pin that protrudes from the respective fork arm or by a recess formed in the respective fork arm. For example, each fork arm may include two or more engagement structures that are arranged spaced to each other along the fork arm. The engagement structures provide the benefit that slipping of the upper body structure may be reliably prevented.

The first and second fork arms each are movable between the retracted position and a first extended position, in which the fork arms protrude in the lateral direction from a first lateral side of the platform base, and between the retracted position and a second extended position, in which the fork arms protrude in the lateral direction from a second lateral side of the platform base. In other words, the fork arms may be moved or extended to both opposite lateral sides of the platform base. Accordingly, loading and unloading of the upper body structure is possible from both sides.

Additionally, the first and second fork arms each may be configured as telescopic arms. For example, each fork arm may include a guide rail that extends in the lateral direction, a support rail arrangement having at least on support rail guided on the guide rail, and a fork arm rail guided on a support rail of the support rail arrangement. A telescopic configuration of the fork arms provides the benefit that, on the one hand, the fork arm may be extended to a relatively high length while it may be compactly stored in the retracted position. On the other hand, the upper body structure may be easily supported over its entire width which eases positioning and further prevents slipping or tipping of the upper body structure.

According to some exemplary embodiments, the lifting mechanism may include at least one lifting arrangement. The lifting mechanism may include a first lifting arrangement coupled to the first fork arm and second lifting arrangement coupled to the second fork arm. Generally, the lifting arrangement may include a first longitudinal member having a first end coupled to the platform base to be rotatable about a first rotational axis, and a second longitudinal member having a first end movably guided on the platform base along the lateral direction and a connection site rotatably coupled to a connection site of the first longitudinal member about a second rotational axis parallel to the first rotational axis, the connection site of the second longitudinal member being positioned between the first end and an opposite second end of the second longitudinal member, and the connection site of the first longitudinal member being positioned between the first end and an opposite second end of the first longitudinal member.

The first and second rotational axes, in particular, extend perpendicular to the lateral direction. The lifting arrangement may further include a drive device, in particular an extendable arrangement such as a hydraulic cylinder, coupled to the second longitudinal member and a structure which is distanced stationary with respect to the first rotational axis, so that the drive device is configured to vary a distance between the first end of the first longitudinal member and the second end of the second longitudinal member in the lateral direction to lift or lower second ends of the first and second longitudinal members relative to the platform base in the vertical direction. The second ends of the first and second longitudinal members may be coupled to at least one of the first and second fork arms. The drive device, for example, may be coupled to the first longitudinal member between the second end and the connection site of the first longitudinal member, and to the second longitudinal member between the first and the connection site of the second longitudinal member.

The lifting arrangement, as described above, is a scissor like mechanism which is aligned along the lateral direction. To lift the fork arm, the distance between the first end of the first longitudinal member and the first end of the second longitudinal member is decreased, and to lower the fork arm, the distance between the first end of the first longitudinal member and the first end of the second longitudinal member is increased. The configuration of this embodiment provides the benefit that it is very compact and may be assembled to the platform base in a space saving manner. Further, it is configured to lift very high masses.

According to some exemplary embodiments, the platform base may include a plurality of coupling interfaces formed on a top face of the platform base and configured to engage with corresponding platform coupling interfaces of the upper body structure. Thereby, a defined position of the upper body structure relative to the platform base may easily be achieved. The coupling interfaces may be formed as connection pins configured to receive connection holes forming the platform coupling interfaces. Each connection hole may include a movable locking pin configured to lock the connection pin within the connection hole.

Additionally, each locking pin and the corresponding connection pin together form a switchable magnetic latch. Each locking pin may include a permanent magnet and each connection pin is configured as a rotatable permanent magnet to switch the magnetic latch. In this exemplary embodiment, the connection between the upper body structure and the platform base is realized by a simplified and fault-proof yet effective magnetic latch system, which may for example be integrated in connection holes within the upper body structure. However, a corresponding magnetic latch system may equally well be employed to fix the upper body structure at the fork arms by aid of the fork arm engagement structure and the engagement structure of the fork arm.

According to some embodiments, the vehicle platform may further include at least one support leg configured to extend in the lateral direction from the lateral side of the platform base to stabilize the vehicle platform on the ground against tipping. For example, two or more support legs that are spaced along the longitudinal direction may be provided. By the support leg, stability of the vehicle platform against tipping and rolling over may be improved which further eases loading and unloading.

The platform base may include an electric interface configured for electrical connection with a platform electric connection interface of the upper body structure. For example, the platform electric connection interface may be a socket or plug including a plurality of electric contact structures such as pins. This configuration eases electrical connection between the platform and the upper body structure. In particular, the electric connection by automatically be achieved by simply positioning the upper body structure on the platform base.

The features, technical effects, and benefits described in connection with one aspect of the invention are also disclosed for the other aspects of the invention and vice versa.

BRIEF DESCRIPTION OF THE FIGURES

For a more complete understanding of the present invention and advantages thereof, reference is now made to the following description taken in conjunction with the accompanying drawings. The invention is explained in more detail FIG. 1 schematically shows a modular motor vehicle having a vehicle platform that can be equipped with a purpose-built upper body structure.

Although specific embodiments are illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1:
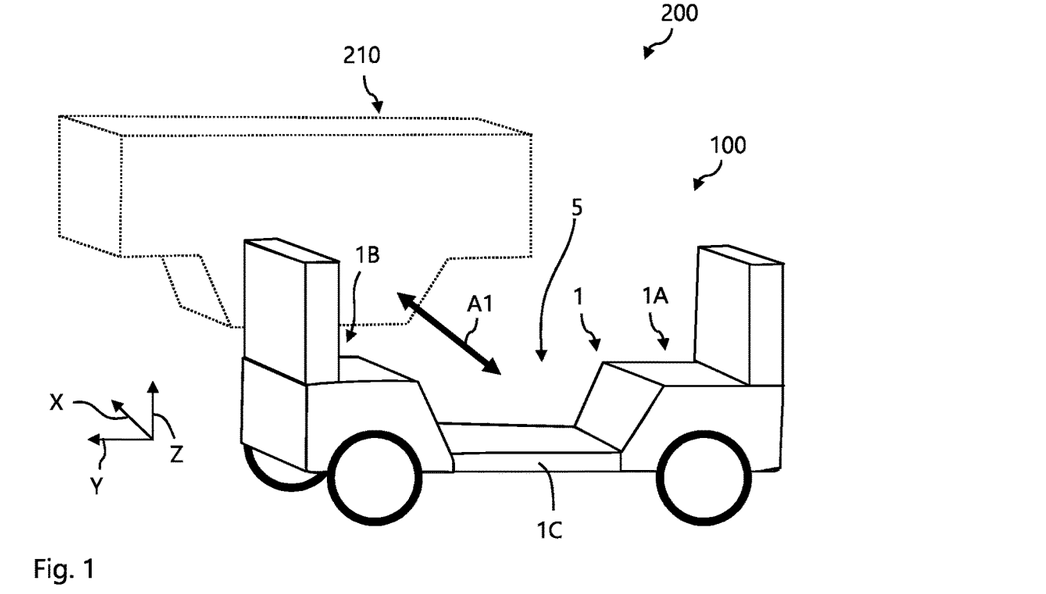

FIG. 1 schematically depicts a modular motor vehicle 200 having a vehicle platform 100 that may be equipped with an upper body structure 210 by loading the upper body structure 210 to the platform 100 in a movement of the body structure 210 along a lateral direction Y, as symbolically indicated in FIG. 1 by arrow A1. The motor vehicle 200 may be, for example, a purpose-built vehicle (PBV) that is designed in a modular fashion based on two main parts, namely the vehicle platform 100 or skateboard and the upper body structure 1 or hat. The vehicle platform 100 represents the common substructure of the PBV 200 comprising chassis, powertrain, electric batteries and so on. The upper body structure 210 on the other hand may come in different variants fulfilling various purposes according to the customer's needs, e.g. cargo transportation like last-mile delivery or similar, passenger transportation like autonomous shuttle services, buses, taxis and so on.

In the exemplary embodiment of FIG. 1, the vehicle platform 100 is generally U-shaped, while the upper body structure 210 is complementary formed. It is to be understood of course that the shown shape and configuration is merely an example. Other shapes and configurations are of course possible, e.g. a flat vehicle platform 100 with a box-shaped upper body structure 1 on top of it.

Figure 2:
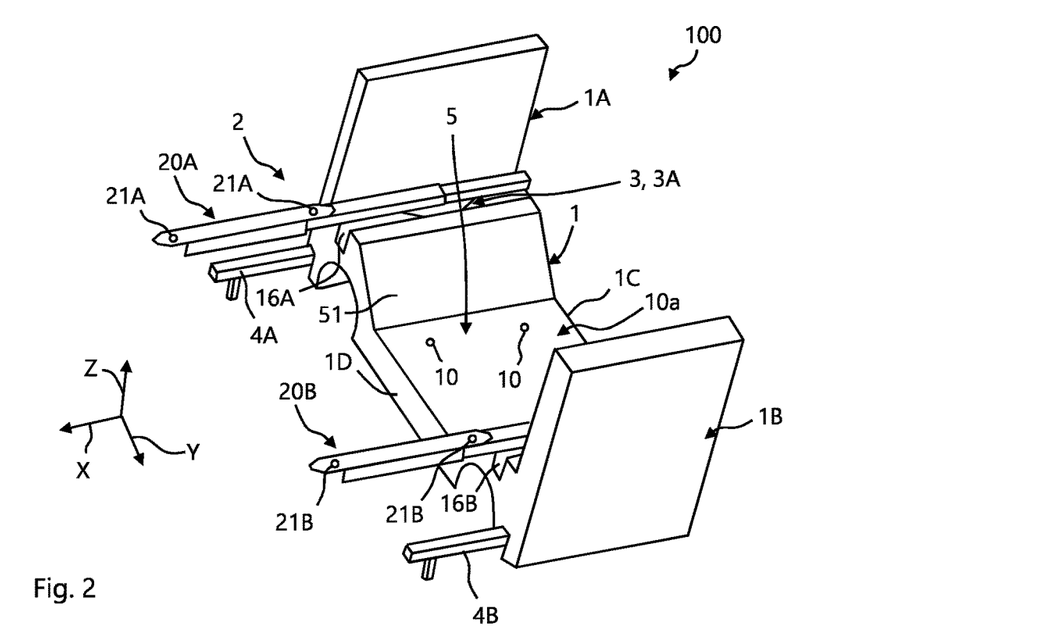
FIG. 2 shows a perspective view of vehicle platform according to an embodiment of the invention.
Figure 3:
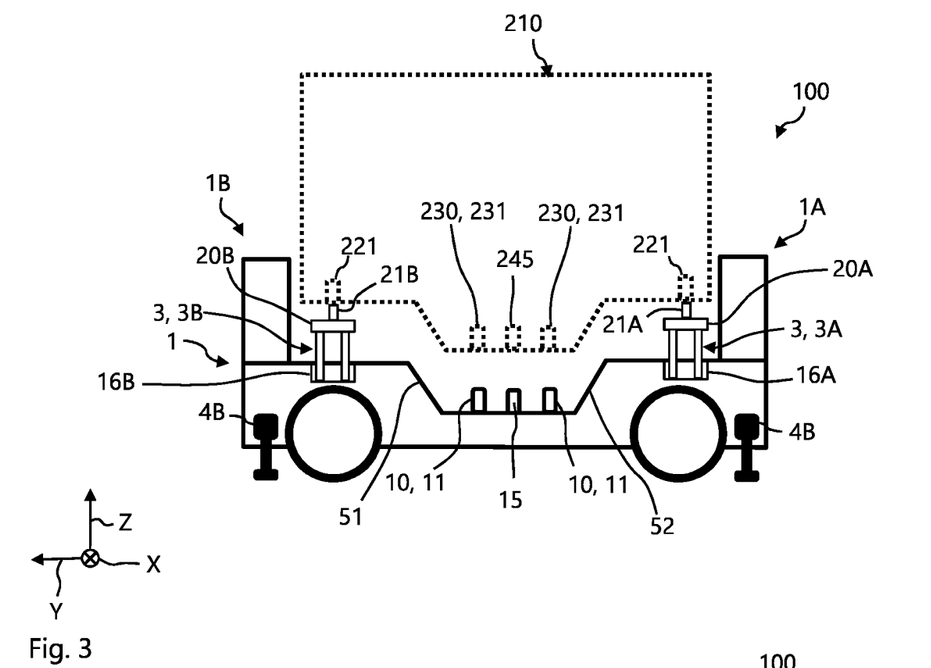
FIG. 3 shows a side view along a lateral direction to the vehicle platform of FIG. 2, wherein an upper body structure that can be loaded to the vehicle platform is illustrated, too.
Figure 4:
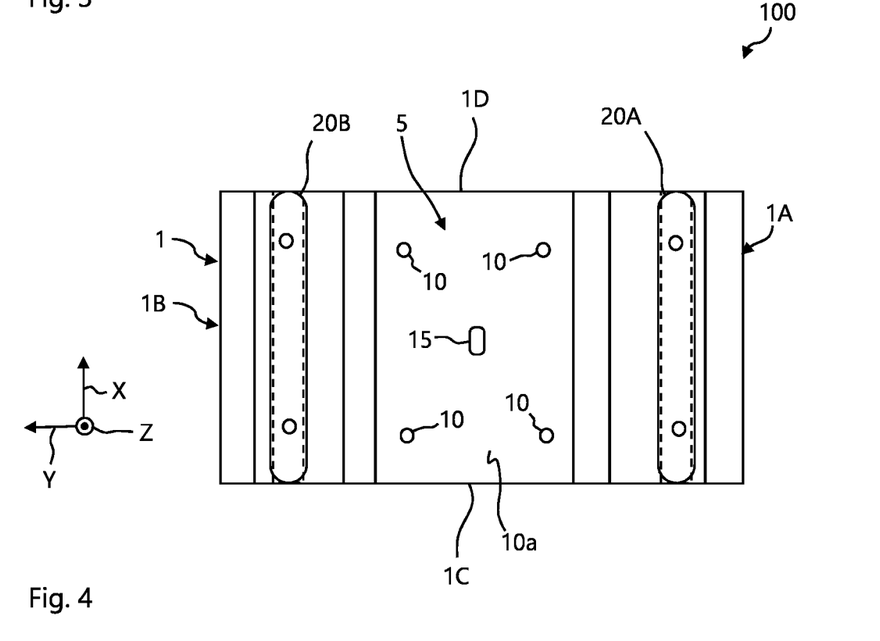
FIG. 4 shows plan view along a vertical direction to the vehicle platform of FIG. 2, wherein fork arms of the vehicle platform are shown in a retracted position.
Figure 5:
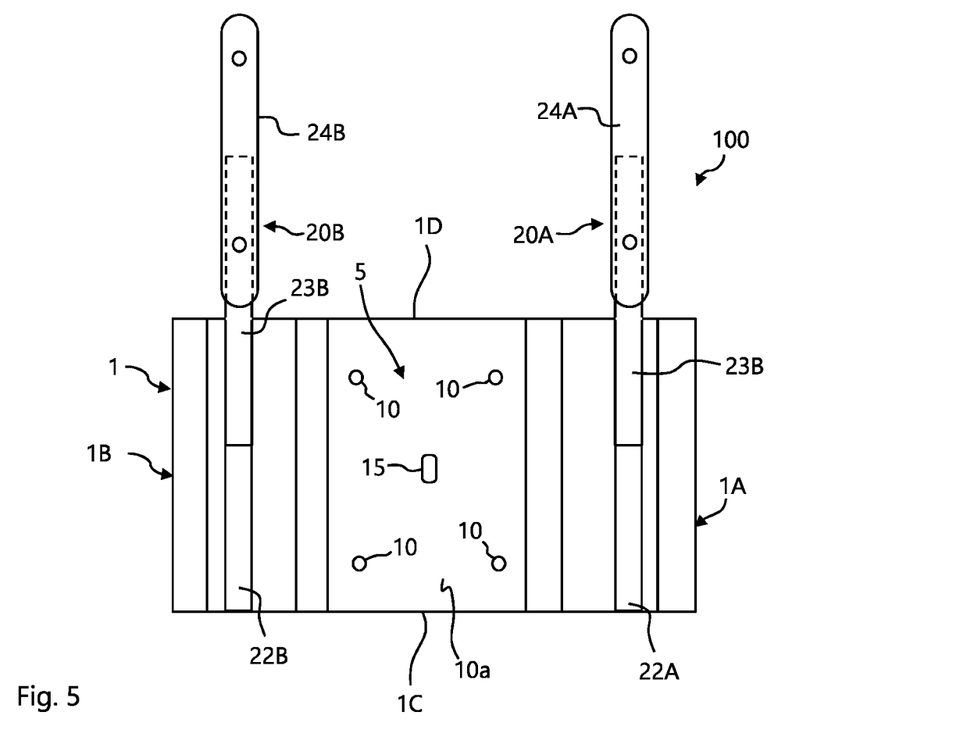
FIG. 5 shows plan view along a vertical direction to the vehicle platform of FIG. 2, wherein the fork arms of the vehicle platform are shown in an extended position.

FIG. 2 exemplarily shows a perspective view of the vehicle platform 100. FIG. 3 shows a side view of the vehicle platform 100 of FIG. 2. FIGS. 4 and 5 show top views of the vehicle platform 100 of FIG. 2. The vehicle platform 100 may include a platform base 1 and a loading system 2 for laterally loading and unloading the upper body structure 210 onto and from the platform base 1 or the vehicle platform 100.

As already explained above and as shown in FIG. 1, the platform base 1 may be generally U-shaped or have a different outer design. The platform base 1 may include a receiving portion 5 for receiving the upper body structure 210. For example, the receiving portion 5 may include top face 10a in the form of a substantially even surface, as exemplarily shown in FIG. 2. Further optional, the receiving portion 5 may include ramps 51, 52 extending at opposite ends from the top face 10a. Generally, the platform base 1 extends along a longitudinal direction Y between opposite first and second ends 1A, 1B and has first and second lateral sides 1C, 1D which extend between the first and second ends 1A, 1B and which are opposite to each other with respect to a lateral direction X. As visible in FIG. 2, the platform base 1, thus, may have a substantially rectangular circumference. The lateral direction X extends transverse to the longitudinal direction Y. A vertical direction Z extends transverse to the longitudinal direction Y and to the lateral direction X.

As is only schematically shown in FIG. 2, the platform base 1 may optionally include a plurality of coupling interfaces 10. As is visible in FIGS. 4 and 5 the coupling interfaces 10 are positioned within the receiving portion 5 and may, for example, be formed on the top face 10a of the platform base 1. For example, there may be two pairs of coupling interfaces 10 that are spaced to each other in the longitudinal direction Y, wherein the coupling interfaces 10 of one pair are spaced to each other in the lateral direction X. However, of course, another number and positioning of the coupling interfaces 10 is possible, too. Generally, the coupling interfaces 10 may be distributed over the top surface to be spaced in preferably the lateral direction X and the longitudinal direction Y.

The coupling interfaces 10 may, for example, be formed as connection pins 11 protruding from the top face 10a of the platform base 10, as schematically shown in FIG. 3. As is further shown in FIG. 3, the upper body structure 210 may include platform coupling interfaces 230 in the form of connection holes 231 in which the connection pins 11 can be received. However, other configurations are possible, too. Generally, the coupling interfaces 10 are configured to engage with corresponding platform coupling interfaces 230 of the upper body structure 210.

Figure 14:
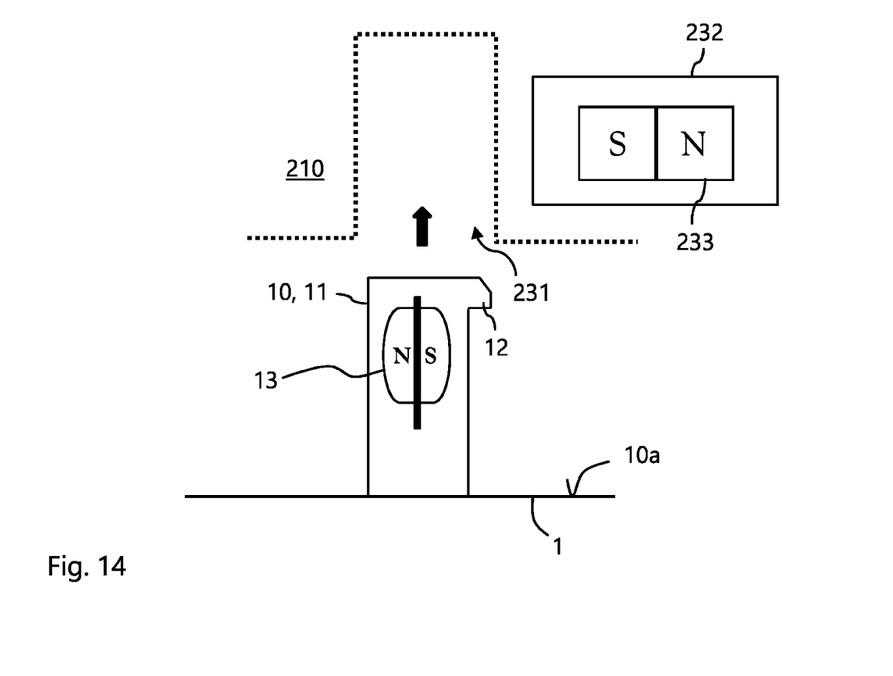
FIG. 14 schematically shows a magnetic latch system of a vehicle platform according to an exemplary embodiment of the invention.
Figure 15:
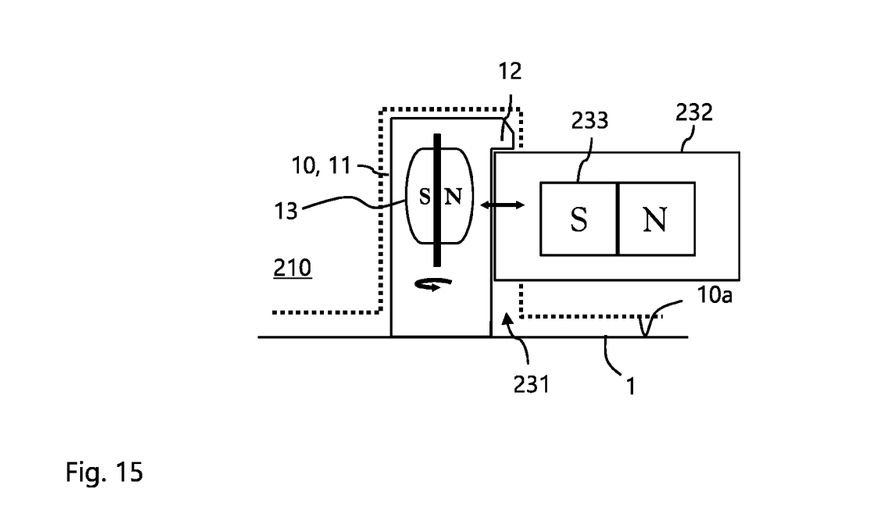
FIG. 15 shows the latch system of FIG. 14 in a locked state.

The coupling interfaces 10 facilitate positioning of the upper body structure 210 and hold the upper body structure in place relative to the platform base 1. To further improve a connection between the platform base 1 and the upper body structure 210, a latch system may be employed which is schematically shown in FIGS. 14 and 15. As shown in FIGS. 14 and 15, the connection holes 231 of the upper body structure 210 may include a locking pin 232 which is movable between an open position (FIG. 14), in which it is retracted from the connection hole 231, and a locking position, in which it protrudes into the connection hole (FIG. 15). The connection pin 11 may include an undercut 12. When the connection pin 11 is introduced into the connection hole 231, the locking pin 232 is moved into its locking position to engage the undercut 12 of the connection pin, whereby the connection pin 11 is locked in the connection hole 231. Thus, the locking pin 232 is configured to lock the connection pin 11 within the connection hole 231.

As symbolically shown in FIGS. 14 and 15, the connection pin 11 may configured as a rotatable permanent 13 magnet. The locking pin 232 on the other hand may also be provided with an integrated permanent magnet 233. To lock the connection pin 11 with the connection hole 231, the rotatable permanent magnet 13 of the connection pin 11 may be rotated by about 180° once the connection pin 11 has been introduced in the connection hole 231 to orient the magnetic poles of the rotatable permanent magnet 13 such that the movable locking pin 232 is magnetically drawn against the connection pin 11. The connection pin 11 may be rotatably mounted to the platform base 1. In particular, it may be provided that, the connection pin 11 is rotatable by an actuator (not shown), wherein, when the actuator is deactivated, the connection pin 11 is allowed to rotate freely. In this regard, it is advantageous when the magnet 233 of the locking pin 232 is oriented such that the magnet 13 of the connection pin 11 is rotated to interlock with the locking pin 232.

As is further shown in particular in FIGS. 3 to 5, the platform base 1 may optionally include an electric interface 15 configured for electrical connection with a platform electric connection interface 245 of the upper body structure 210. As schematically shown in FIG. 3, electric interface 15 may be realized as a plug protruding from the top face 10a of the platform base 10. However, it would also be possible to realize the electric interface 15 as a socket or similar. Generally, the electric interface 15 may include electric contact structures (not shown) such as pins or similar.

Referring again to FIGS. 2 to 5, the loading system 2 of the vehicle platform 100 may include a first fork arm 20A, a second fork arm 20B, and a lifting mechanism 3. As is visible from FIG. 3, the lifting mechanism 3 may include a first lifting arrangement 3A for moving the first fork arm 20A in the vertical direction Z, and a second lifting arrangement 3B for moving the second fork arm 20B in the vertical direction Z. However, it would also be possible to provide one common lifting arrangement for the first and the second fork 20A, 20B. The lifting mechanism 3 will be explained in more detail below.

The first fork arm 20A and the second fork arm 20B are provided to support upper body structure 210 with respect to the vertical direction Z and move the upper body structure 210, in particular, in the lateral direction X. The lifting mechanism 3 is coupled to the first and second fork arms 20A, 20B and is configured to move the fork arms 20A, 20B in the vertical direction Z.

The fork arms 20A, 20B, for example, may be configured as extendable, telescopic arms, as exemplarily shown in FIGS. 2, 4, and 5. For example, each fork arm 20A, 20B may include a guide rail 22A, 22B, a support rail arrangement having at least on support rail 23A, 23B guided on the guide rail 22A, 22B, and a fork arm rail 24A, 24B guided on a support rail 23A, 23B of the support rail arrangement. The support rail 23A, 23B is movable along the guide rail 22A, 22B, and the fork arm rail 24A, 24B is movable along the support rail 23A, 23B. Thereby, the fork arm 20A, 20B may be extended linearly. The fork arms 20A, 20B, however, may also have another configuration, e.g. having only the fork arm rail 24A, 24B.

The fork arms 20A, 20B are coupled to the platform base 1, e.g. via the lifting mechanism 3. As is exemplarily shown in FIGS. 2, 4, and 5, the fork arms 20A are positioned distanced to each other in the longitudinal direction Y and oriented such that they extend in the lateral direction. For example, the first fork arm 20A may be arranged in the region of the first end 1A of the platform base 1, and the second fork arm 20B may be arranged in the region of the second end 1B of the platform base 1. In particular, top face 10a of the platform base having the coupling interfaces 10 may be arranged between the fork arms 20A, 20B with respect to the longitudinal direction Y, as exemplarily shown in FIGS. 2 to 5. In particular, as exemplarily shown in FIGS. 2 to 5, the fork arms 20A, 20B may be arranged on a top end side of the ramps 51, 52.

Further, the fork arms 20A, 20B are movable, either independently from each other or in concert, along the lateral direction X relative to the platform base 1. For moving the fork arms 20A, 20B, an actuator or fork arm driving device (not shown) may be provided, e.g. a spindle drive, a hydraulic or pneumatic cylinder, or similar. FIGS. 2 and 5 exemplarily show the fork arms 20A, 20B in an extended position, in which the fork arms 20A, 20B protrude in the lateral direction X from a lateral side 1C, 1D of the platform base 1. FIG. 4 shows the fork arms 20A, 20B in a position, in which the fork arms 20A, 20B completely overlap with the platform base 1. Therefore, the fork arms 20A, 20B are movable linearly between the retracted and the extended position.

FIGS. 2 and 5 exemplarily show the first and second fork arms 20A, 20B in an extended position in which they protrude from or extend over the second lateral side 1D of the platform base 1. Optionally, the fork arms 20A, 20B each may be movable between the retracted position and a first extended position, in which the fork arms 20A, 20B protrude in the lateral direction X from the first lateral side 1C of the platform base 1, and between the retracted position and a second extended position, in which the fork arms 20A, 20B protrude in the lateral direction X from a second lateral side 1D of the platform base 1.

As is schematically shown in FIGS. 2, 4, and 5, the first and second fork arms 20A, 20B each may include at least one engagement structure 21A, 21B configured to engage with a corresponding fork arm engagement structure 221 of the upper body structure 210. As shown in FIGS. 2, 4, and 5, each fork arm 20A, 20B may, for example, include two engagement structures 21A, 21B that are arranged distanced to each other. FIG. 3 schematically shows that the engagement structures 21A, 21B of the fork arms 20A, 20B may, for example, be formed by a pin protruding from the respective fork arm 20A, 20B, in particular, from a support surface of the fork arm rail 24A, 24B (FIG. 5). As shown in FIG. 3, fork arm engagement structure 221 of the upper body structure 210 may be a hole, in this example. Of course, it would also be possible to realize the engagement structures 21A, 21B of the fork arms 20A, 20B as recesses formed in the respective fork arm 20A, 20B, and to realize the fork arm engagement structure 221 as pins.

In FIG. 3, the lifting mechanism 3 is only shown schematically. As is shown in FIG. 3 and as has already been mentioned above, the lifting mechanism 3 may include a first lifting arrangement 3A coupled to the first fork arm 20A and second lifting arrangement 3B coupled to the second fork arm 20B. Each lifting arrangement 3A, 3B is also coupled to the platform base 1. Thus, the lifting mechanism 3 coupled to the platform base 1 and the first and second fork arms 20A, 20B. As exemplarily shown in FIGS. 2 and 3, the lifting arrangements 3A, 3B may be arranged in a chamber 16A, 16B forming a recess of the platform base 1 with respect to the vertical direction Z and extending in the lateral direction X.

Figure 6:
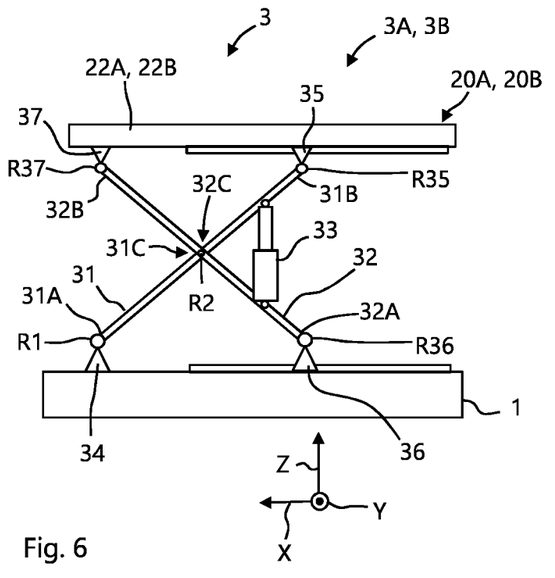
FIG. 6 schematically shows a side view of a lifting arrangement of a lifting mechanism of a vehicle platform according to an exemplary embodiment of the invention.
Figure 7:
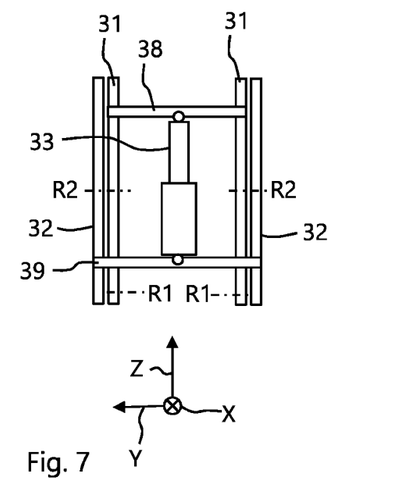
FIG. 7 shows a further side view of the lifting arrangement of FIG. 6.

FIGS. 6 and 7 schematically illustrate a possible configuration of a lifting arrangement that may from the first and/or the second lifting arrangement 3A, 3B. As schematically shown in FIG. 6, the lifting arrangement 3A, 3B may include a first longitudinal member 31, a second longitudinal member 32, and a drive device 33. The first and second longitudinal member 31, 32 may, for example, be metallic rods or profiles. Each longitudinal member 31, 32 extends, preferably linearly, between a first end 31A, 32A and a second end 31B, 32B. The drive device 33, in particular, may be extendable. For example, the drive device 33 may be a spindle drive, a hydraulic or pneumatic cylinder, a linear motor, or similar. FIG. 6 only by way of example schematically shows a hydraulic cylinder.

As shown in FIG. 6, the first end 31A of the first longitudinal member 31 is to the platform base 1 to be rotatable about a first rotational axis R1, e.g. via a first pivot bearing 34. The first rotational axis R1 is preferably orthogonal to the lateral direction X and remains stationary relative to the platform base 1. The second end 31B of the first longitudinal member 31 may, for example, be coupled to the respective fork arm 20A, 20B. For example, the second end 31B of the first longitudinal member 31 may be coupled to a first coupling bearing 35 which is linearly guided along the fork arm 20A, 20B, in particular, along the guide rail 22A, 22B of the fork arm 20A, 20B. The first coupling bearing 35 may, for example, define a rotational axis R35 parallel to the first rotational axis R1.

The first end 32A of the second longitudinal member 32 is movably guided on the platform base 1 along the lateral direction X. For example, a second pivot bearing 36 may be linearly guided along the lateral direction X on the platform base 1 and defines a rotational axis R36 parallel to the first rotational axis R1. The first end 32A of the second longitudinal member 32 rotatable about the rotational axis R36. The second end 32B of the second longitudinal member 32 is coupled to the respective fork arm 20A, 20B, e.g. to the guide rail 22A, 22B of the fork arm 20A, 20B. In particular, the second end 32B of the second longitudinal member 32 may be coupled to the fork arm 20A, 20B by a pivot bearing 37 which is stationary fixed to the fork arm 20A, 20B, wherein the second end 32B of the second longitudinal member 32 is rotational about a rotational axis R37 defined by the pivot bearing 37 and parallel to the first rotational axis R1.

As is further shown in FIG. 6, a connection site 32C of the second longitudinal member 32 is rotatably coupled to a connection site 31C of the first longitudinal member 31. The connection sites 31C, 32C of the first and second longitudinal members 31, 32, therefore, is rotatable about a second rotational axis R2 that is parallel to the first rotational axis R1. The connection site 32C of the second longitudinal member 32 may be positioned between the first end 32A and the second end 32B of the second longitudinal member 32. The connection site 31C of the first longitudinal member 31 is positioned between the first end 32A and the second end 32B of the first longitudinal member 31.

As exemplarily shown in FIG. 6, the drive device 33 may be coupled to the second longitudinal member 32 between the first end 32A of the second longitudinal member 32 and the connection site 32C the second longitudinal member 32, and to the first longitudinal member 31 between the second end 31A of the first longitudinal member 31 and the connection site 31C the first longitudinal member 31. Therefore, when the drive device 33 extends, the distance between the first end 31A of the first longitudinal member 31 and the second end 32B of the second longitudinal member 32, and the distance between the first end 32A of the second longitudinal member 32 and the second end 31B of the first longitudinal member 31 increases. On the other hand, when the drive device 33 extends, the distance between the first end 31A of the first longitudinal member 31 and the first end 31B of the second longitudinal member 32, and the distance between the second end 32B of the second longitudinal member 32 and the second end 31B of the first longitudinal member 31 decreases.

Alternatively, it would also be possible, to couple the drive device 33 directly to the platform base 1 and to any point of the second longitudinal member 32, for example. Generally, the drive device 33 may be coupled to the second longitudinal member 32 and a structure which is distanced stationary with respect to the first rotational axis R1, so that the drive device is configured to vary a distance between the first end 31A of the first longitudinal member 31 and the second end 32A of the second longitudinal member 32 in the lateral direction X to lift or lower second ends 31B, 32B of the first and second longitudinal members 31, 32 relative to the platform base 1 in the vertical direction Z.

In FIG. 6, a side view of the lifting arrangement 3A, 3B is shown with a viewing direction along the first rotational axis R1. FIG. 7 shows a side view of the lifting arrangement 3A, 3B with a viewing direction transverse the first rotational axis R1. As exemplarily shown in FIG. 7, the lifting arrangement 3A, 3B may include a pair of first longitudinal members 31, and a pair of second longitudinal members 32 in the arrangement as described above, wherein the first longitudinal members 31 extend parallel, and wherein the second longitudinal members 32 extend parallel. As further shown in FIG. 7, the first longitudinal members 31 may be coupled to each other by a first bridge 38, and the second longitudinal members 32 may be coupled to each other by a second bridge 39. The first bride 38 may be arranged between the connecting sites 31C and the second ends 31B of the first longitudinal members 31. The second bride 39 may be arranged between the connecting sites 32C and the first ends 32A of the second longitudinal members 32. As is further shown in FIG. 7, the drive device 33 may be coupled to the first and second bridges 38, 39.

As is particularly shown in FIGS. 2 and 3, the vehicle platform 100 optionally may include at least one support leg 4A, 4B. For example, the vehicle platform 100 may include a first support leg 4A arranged in the region of the first end 1A of the platform base 1, and a second support leg 4B arranged in the region of the second end 1B of the platform base 1. The support legs 4A, 4B are configured to extend in the lateral direction X. In other words, the support legs 4A, 4B are movable along the lateral direction X into an extended position so that they protrude from the lateral side 1C, 1D of the platform base 1, as shown in FIG. 2, for example. The support legs 4A, 4B may be extended along the vertical direction Z, too, so that they contact the floor or ground to stabilize the vehicle platform 100 on the ground against tipping. Optionally, the support legs 4A, 4B may be extended to both lateral sides 1C, 1D of the platform base 1.

FIGS. 8 to 12 exemplarily show a process of loading the upper body structure 210 onto the vehicle platform 100. FIG. 13 shows a flow chart of a method M for loading and unloading an upper body structure 210 onto and from a vehicle platform 100 of a motor vehicle 200. This method M may include or be part of the process shown in FIGS. 8 to 12. Therefore, the method M will be explained below by referring to FIGS. 8 to 12 and to FIG. 13. As the method M may be carried out using the vehicle platform 100 explained above, it will be referred to the vehicle platform 100 shown in FIGS. 2 to 7 in the following.

Figure 8:
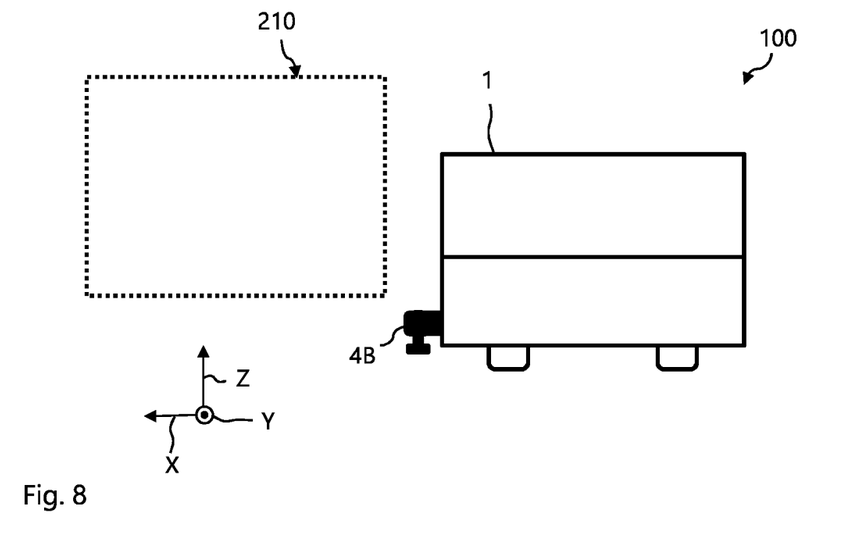
FIGS. 8 to 12 show successive steps of a loading process using the vehicle platform of FIG. 2.
Figure 9:
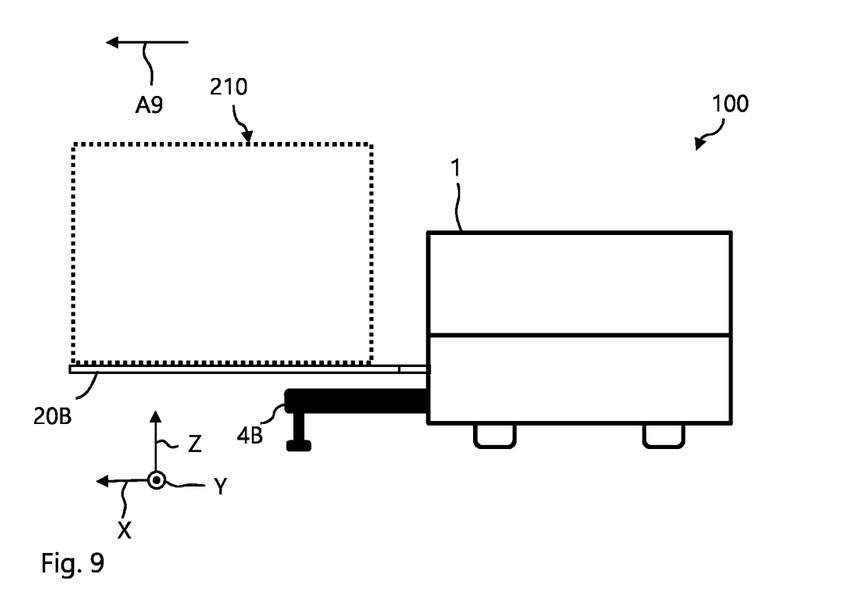

FIG. 8 shows a state, in which the vehicle platform 100 has been parked relative to the upper body structure 210 such that the upper body structure 210 is positioned neighbored or proximate to one of the lateral sides 1C, 1D with respect to the lateral direction X. Next, optionally, the support legs 4A, 4B may be extended to stand on the ground to further stabilize the vehicle platform 100 (FIG. 9).

Further, the fork arms 20A, 20B in a step M1 of the method M, the first and second fork arms 20A, 20B are engaged with the upper body structure 210. In the loading process shown in FIGS. 9 to 12, this may include moving the fork arms 20A, 20B into to their extended position, as symbolically shown in FIG. 9 by arrow A9, to position the lifting arms 20A, 20B underneath the upper body structure 210, and lifting the fork arms 20A, 20B in the vertical direction Z by the lifting mechanism 3 until the optional engagement structures 21A, 21B of the fork arms 20A, 20B engage with the fork arm engagement structures 221 of the upper body structure 210. In the unloading process, step M1 may only include lifting the fork arms 20A, 20B in the vertical direction Z until they engage the upper body structure 210, e.g. until the optional engagement structures 21A, 21B of the fork arms 20A, 20B engage with the fork arm engagement structures 221 of the upper body structure 210.

Figure 10:
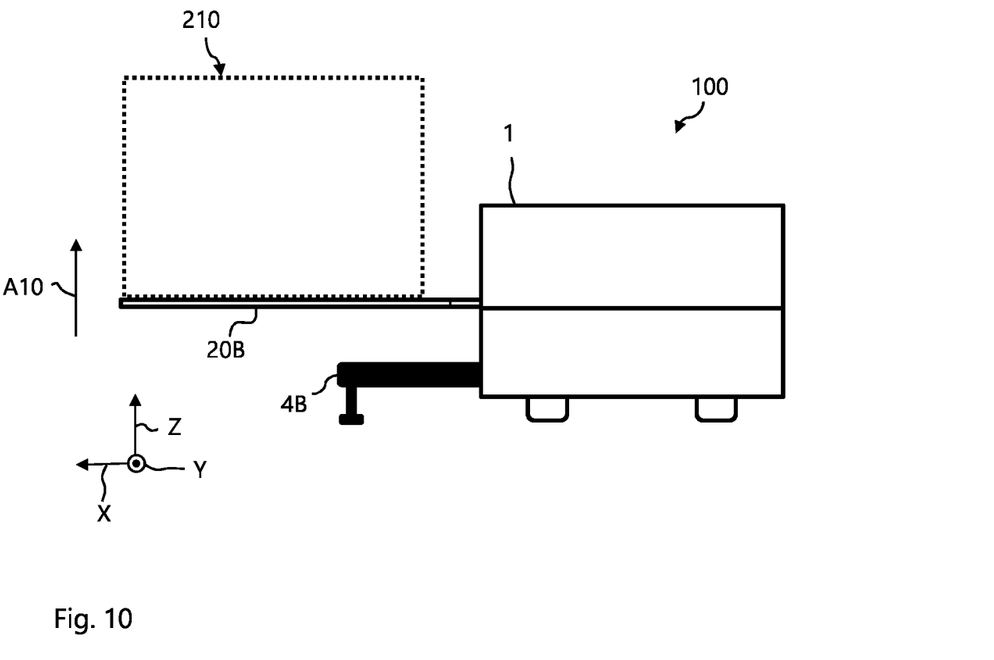
Figure 11:
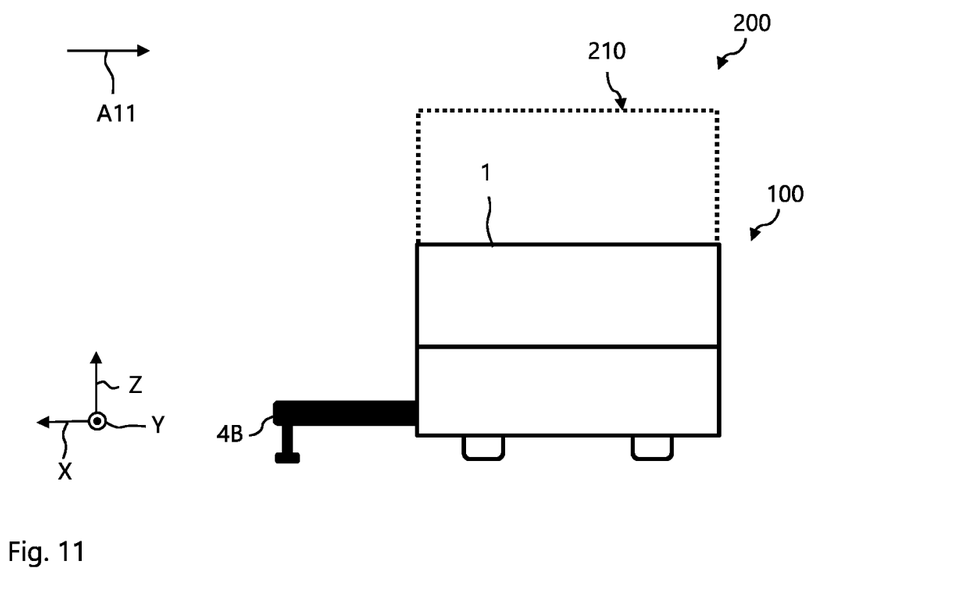

In a further step M2 of the method, the upper body structure 210 is lifted by moving the first and second fork arms 20A, 20B in the vertical direction Z relative to the platform base 1 by the lifting mechanism 3, as symbolically shown in FIG. 10 by arrow A10. In this step, the upper body structure 210, in the loading process, is lifted from the ground. In the unloading process, in this step, the upper body structure 210 is lifted from the platform base 1.

In step M3 of the method, the fork arms 20A, 20B are moved in the lateral direction X over the respective lateral side 1C, 1D of the platform base 1. In the loading process shown in FIGS. 8 to 12, in this step M3, the fork arms are moved into their retracted position, as symbolically shown in FIG. 11 by arrow A11. Thereby, the upper body structure 210 is moved linearly into the receiving portion 5 of the platform base 1, in particular to a position above the top face 10. In an unloading process, the fork arms 20A, 20B would be moved to their extended positions and, thus, the upper body structure 210 would be moved to a position laterally of the platform base 1.

Figure 12:
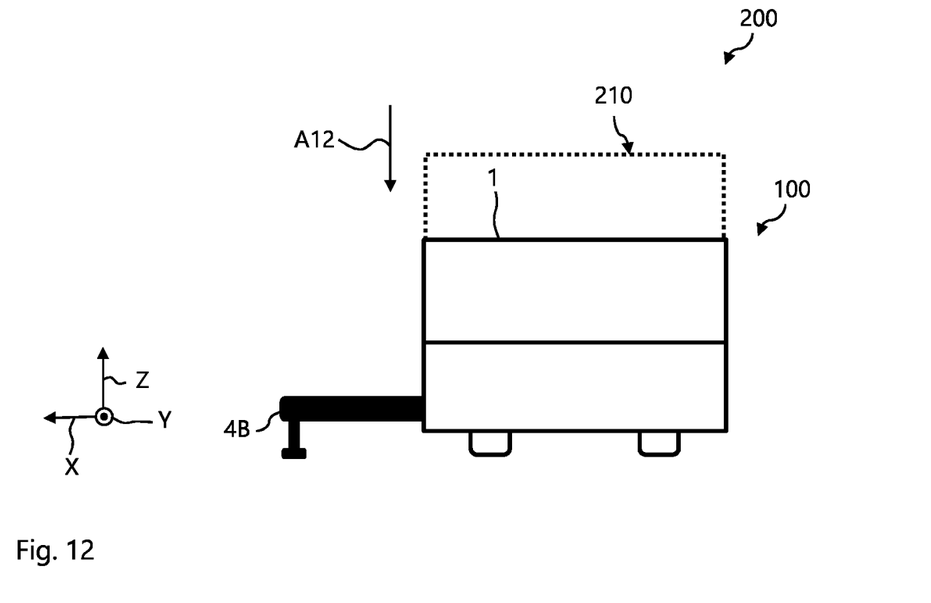
Figure 13:
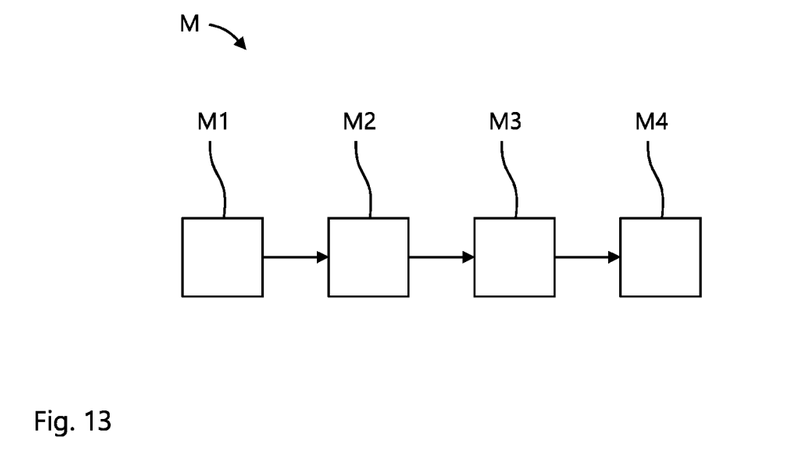
FIG. 13 shows a flow diagram of a method for loading and unloading an upper body structure onto and from a vehicle platform.

In another step M4 of the method M, the upper body structure 210 is lowered by moving the first and second fork arms 20A, 20B in the vertical direction Z relative to the platform base 1 by the lifting mechanism 3, as is symbolically shown in FIG. 12 by arrow A12. In the loading process, in this step M4, the coupling interfaces 10 of the platform base 1 are engaged with the platform coupling interfaces 230 of the upper body structure 210. Optionally, also the electric interface 15 of the platform base 1 is connected with the platform electric connection interface 245 of the upper body structure 210.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents of the different features and embodiments. Many other examples will be apparent to one skilled in the art upon reviewing the above specification. The exemplary embodiments were chosen and described to explain the principles of the invention and its practical applications, to thereby enable others skilled in the art to utilize the invention and various exemplary embodiments with various modifications as are suited to the particular use contemplated.

REFERENCE LIST 1 platform base
1A first end of the platform base
1B second end of the platform base
1C first lateral side of the platform base
1D second lateral side of the platform base
2 loading system
3 lifting mechanism
3A, 3B lifting arrangements
4A, 4B support legs
5 receiving portion
10 coupling interface of the platform base
10a top face of the platform base
11 connection pin
12 undercut
13 permanent magnet 15 electric interface
16A, 16B chambers
20A, 20B fork arms
21A, 21B engagement structure
22A, 22B guide rail
23A, 23B support rail
24A, 24B fork arm rail
31 first longitudinal member
31A first end of the first longitudinal member
31B second end of the first longitudinal member
31C connection site of the first longitudinal member
32 second longitudinal member
32A first end of the second longitudinal member
32B second end of the second longitudinal member
32C connection site of the second longitudinal member
33 driving device
34 first pivot bearing
35 first coupling bearing
36 second pivot bearing
37 second coupling bearing
38 first bridge
39 second bridge
51, 52 ramps
100 vehicle platform
200 vehicle
210 upper body structure
211 fork arm engagement structure
221 fork arm engagement structure
230 platform coupling interface
231 connection hole
232 locking pin
233 permanent magnet
245 platform electric connection interface
A1 arrow
A9-A12 arrows
M method
M1-M4 method steps
X lateral direction
Y longitudinal direction
Z vertical direction

What is claimed is:

1. A vehicle platform for a motor vehicle, comprising:
a platform base extending in a longitudinal direction; and
a loading system for laterally loading and unloading an upper body structure onto and from the platform base,
wherein the platform base includes a plurality of coupling interfaces formed on a top face of the platform base and configured to engage with corresponding platform coupling interfaces of the upper body structure,
wherein the loading system includes:
a first fork arm and a second fork arm for supporting the upper body structure with respect to a vertical direction, and
a lifting mechanism coupled to the platform base and the first and second fork arms,
wherein the lifting mechanism is configured to move the first and second fork arms relative to the platform base along the vertical direction,
wherein the first and second fork arms are positioned distanced to each other in the longitudinal direction and each are movable along a lateral direction between a retracted position, in which the fork arms completely overlap with the platform base, and an extended position, in which the fork arms protrude in the lateral direction from a lateral side of the platform base,
wherein the first and second fork arms each include at least one engagement structure configured to engage with a corresponding fork arm engagement structure of the upper body structure, and
wherein the at least one engagement structure of the first and second fork arms is formed by a pin protruding from the respective fork arm or by a recess formed in the respective fork arm.

2. The vehicle platform according to claim 1, wherein the first and second fork arms each are movable between the retracted position and a first extended position, in which the fork arms protrude in the lateral direction from a first lateral side of the platform base, and between the retracted position and a second extended position, in which the fork arms protrude in the lateral direction from a second lateral side of the platform base.

3. The vehicle platform according to claim 2, wherein the first and second fork arms each are configured as telescopic arms.

4. The vehicle platform according to claim 3, wherein the lifting mechanism includes at least one lifting arrangement, comprising:
a first longitudinal member having a first end coupled to the platform base to be rotatable about a first rotational axis,
a second longitudinal member having a first end movably guided on the platform base along the lateral direction and a connection site rotatably coupled to a connection site of the first longitudinal member about a second rotational axis parallel to the first rotational axis, the connection site of the second longitudinal member being positioned between the first end and an opposite second end of the second longitudinal member, and the connection site of the first longitudinal member being positioned between the first end and an opposite second end of the first longitudinal member, and
a drive device coupled to the second longitudinal member and a structure which is distanced stationary with respect to the first rotational axis, and the drive device is configured to vary a distance between the first end of the first longitudinal member and the second end of the second longitudinal member in the vertical direction to lift or lower second ends of the first and second longitudinal members relative to the platform base in the vertical direction,
wherein the second ends of the first and second longitudinal members are coupled to at least one of the first and second fork arms.

5. The vehicle platform according to claim 4, wherein the lifting mechanism includes a first lifting arrangement coupled to the first fork arm and second lifting arrangement coupled to the second fork arm.

6. The vehicle platform according to claim 1, wherein the coupling interfaces are formed as connection pins configured to receive connection holes forming the platform coupling interfaces.

7. The vehicle platform according to claim 6, wherein each connection hole is provided with a movable locking pin configured to lock the connection pin within the connection hole.

8. The vehicle platform according to claim 7, wherein each locking pin and the corresponding connection pin together form a switchable magnetic latch, and wherein each locking pin includes a permanent magnet and each connection pin is configured as a rotatable permanent magnet to switch the magnetic latch.

9. The vehicle platform according to claim 8, further comprising:
   at least one support leg that extends in the lateral direction from the lateral side of the platform base to stabilize the vehicle platform on the ground against tipping.

10. The vehicle platform according to claim 9, wherein the platform base includes an electric interface configured for electrical connection with a platform electric connection interface of the upper body structure.

11. A motor vehicle having a vehicle platform according claim 1.

12. A method for loading and unloading an upper body structure onto and from a vehicle platform of the motor vehicle of claim 11, the method comprising:
   engaging first and second fork arms coupled to a platform base of the vehicle platform with the upper body structure, the platform base extending in a longitudinal direction;
   lifting the upper body structure by moving the first and second fork arms in a vertical direction relative to the platform base by a lifting mechanism coupled to the platform base and the first and second fork arms;
   moving the fork arms in a lateral direction over a lateral side of the platform base; and
   lowering the upper body structure by moving the first and second fork arms in the vertical direction relative to the platform base by the lifting mechanism.

* * * * *